(12) United States Patent
Wang et al.

(10) Patent No.: US 10,887,753 B2
(45) Date of Patent: Jan. 5, 2021

(54) METHOD AND APPARATUS FOR DETERMINING AND PROVIDING MOBILITY MANAGEMENT SUPPORT AND PROCESSING REQUIRED BY TERMINAL

(71) Applicant: China Academy of Telecommunications Technology, Beijing (CN)

(72) Inventors: Hucheng Wang, Beijing (CN); Shanzhi Chen, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 16/090,210

(22) PCT Filed: Mar. 9, 2017

(86) PCT No.: PCT/CN2017/076195
§ 371 (c)(1),
(2) Date: Sep. 29, 2018

(87) PCT Pub. No.: WO2017/166987
PCT Pub. Date: Oct. 5, 2017

(65) Prior Publication Data
US 2019/0116484 A1 Apr. 18, 2019

(30) Foreign Application Priority Data

Apr. 1, 2016 (CN) .......................... 2016 1 0204703
Apr. 5, 2016 (CN) .......................... 2016 1 0207483
(Continued)

(51) Int. Cl.
*H04W 4/00* (2018.01)
*H04W 8/08* (2009.01)
(Continued)

(52) U.S. Cl.
CPC ........... *H04W 8/08* (2013.01); *H04L 65/1016* (2013.01); *H04W 8/02* (2013.01); *H04W 8/18* (2013.01);
(Continued)

(58) Field of Classification Search
CPC ......... H04W 8/08; H04W 36/32; H04W 8/26; H04W 8/02; H04W 36/36;
(Continued)

(56) References Cited

U.S. PATENT DOCUMENTS

2012/0163244 A1 6/2012 Park et al.
2014/0140287 A1* 5/2014 Cheng .................. H04W 76/16
370/329
(Continued)

FOREIGN PATENT DOCUMENTS

CN 101640913 A 2/2010
CN 101990280 A 3/2011
(Continued)

OTHER PUBLICATIONS

3rd Generation Partnership Project, Technical Specification Group Services and System Aspects, Feasibility Study on New Services and Markets Technology Enablers, 3GPP TR 22.891 V14.0.0 (Mar. 2016).
(Continued)

*Primary Examiner* — Chuong T Ho
(74) *Attorney, Agent, or Firm* — Kilpatrick Townsend & Stockton, LLP

(57) ABSTRACT

Disclosed are a method and apparatus for determining and providing mobility management support and processing required by a terminal. The method comprises: determining a mobility management mapping relation and a mobility mapping relation of a terminal according to information of the terminal related to mobility management or mobility, the
(Continued)

mobility management mapping relation being a mapping relation between conditions for the terminal and a required mobility support level or mobility management mechanism, and the mobility mapping relation being a mapping relation between the conditions for the terminal and mobility levels of the terminal; and determining, according to the mobility management mapping relation of the terminal or according to the conditions for the terminal and the mobility mapping relation of the terminal, a mobility support level or a mobility management mechanism provided for the terminal. A network side device receives an instruction for providing a mobility support level or a mobility management mechanism for the terminal, and provides mobility management for the terminal according to the instruction. By using the solution provided in embodiments of the present application, on-demand mobility management can be implemented.

12 Claims, 5 Drawing Sheets

(30) Foreign Application Priority Data

Jun. 16, 2016 (CN) .......................... 2016 1 0431403
Jun. 30, 2016 (CN) .......................... 2016 1 0509992

(51) Int. Cl.

| | | |
|---|---|---|
| H04W 8/18 | (2009.01) | |
| H04W 60/02 | (2009.01) | |
| H04W 88/18 | (2009.01) | |
| H04W 8/02 | (2009.01) | |
| H04W 8/26 | (2009.01) | |
| H04W 36/32 | (2009.01) | |
| H04L 29/06 | (2006.01) | |
| H04W 36/00 | (2009.01) | |
| H04W 36/36 | (2009.01) | |
| H04W 48/14 | (2009.01) | |
| H04W 48/04 | (2009.01) | |

(52) U.S. Cl.
CPC ......... *H04W 8/26* (2013.01); *H04W 36/0033* (2013.01); *H04W 36/32* (2013.01); *H04W 36/36* (2013.01); *H04W 60/02* (2013.01); *H04W 88/18* (2013.01); *H04W 48/04* (2013.01); *H04W 48/14* (2013.01)

(58) Field of Classification Search
CPC . H04W 36/0033; H04W 88/18; H04W 60/02; H04W 8/18; H04W 48/04; H04W 48/14; H04W 64/00; H04L 65/1016
USPC .................................................. 370/329, 330
See application file for complete search history.

(56) References Cited

U.S. PATENT DOCUMENTS

| | | | | |
|---|---|---|---|---|
| 2016/0135035 A1* | 5/2016 | Chan | ................. | H04W 28/0226 370/328 |
| 2017/0374608 A1* | 12/2017 | Li | .......................... | H04W 48/08 |
| 2018/0132096 A1* | 5/2018 | Huo | ......................... | H04W 8/08 |
| 2019/0028943 A1* | 1/2019 | Wang | ................. | H04W 36/0083 |
| 2019/0053037 A1* | 2/2019 | Shu | .......................... | H04W 8/08 |

FOREIGN PATENT DOCUMENTS

| | | |
|---|---|---|
| CN | 102056131 A | 5/2011 |
| CN | 102427595 A | 4/2012 |
| CN | 105813195 A | 7/2016 |

OTHER PUBLICATIONS

3rd Generation Partnership Project; Technical Specification Group Services and System Aspects; Study on Architecture for Next Generation System; Release 14; 3GPP TR 23.799 V0.3.0; Mar. 2016.

CATT; Solution for on demand mobility support; SA WG2 Meeting #114; S2-161727; Apr. 11-15, 2016, Sophia Antipolis, France.

Ericsson; Solution on Mobility on Demand; SA WG2 Meeting #115; S2-163164; May 23-27, 2016; Nanjing, P.R. China.

* cited by examiner

METHOD AND APPARATUS FOR DETERMINING AND PROVIDING MOBILITY MANAGEMENT SUPPORT AND PROCESSING REQUIRED BY TERMINAL

This application is a US National Stage of International Application No. PCT/CN2017/076195, filed on Mar. 9, 2017, designating the United States, and claiming the benefit of Chinese Patent Application No. 201610204703.5, filed with the Chinese Patent Office on Apr. 1, 2016, and entitled "Method and apparatus for providing a mobility management support, and method and apparatus for processing mobility management". Chinese Patent Application No. 201610207483.1, filed with the Chinese Patent Office on Apr. 5, 2016, and entitled "Method and apparatus for providing a mobility management support, and a method and apparatus for processing mobility management", Chinese Patent Application No. 201610431403.0, filed with the Chinese Patent Office on Jun. 16, 2016, and entitled "Method and apparatus for determining mobility management support required by and to be provided to a user equipment, and a method and apparatus for processing mobility management", and Chinese Patent Application No. 201610509992.X, filed with the Chinese Patent Office on Jun. 30, 2016, and entitled "Method and apparatus for determining mobility management support required by and to be provided to a user equipment, and a method and apparatus for processing mobility management", which are hereby incorporated by reference in their entireties.

FIELD

The present application relates to the field of wireless communications, and particularly to a method and apparatus for determining and providing mobility management support required by a user equipment, and a method and apparatus for processing mobility management.

BACKGROUND

An on-demand mobility support refers to that mobility supports shall be provided to satisfy different demands in a future 5G network as described in the 3GPP TR 22.891. There will be different communication scenarios in the 5G network, where there are different mobility paradigms of different user equipment, and for example, some user equipment access the network while moving at a high speed, and some other user equipment access the network while roaming, or access the network statically, and different mobility supports are also required for different services, for example, for some services, it is required to reduce the break off and packet loss rate during the process of transmitting the services, so the network is required to have a mobility event hidden from an application layer, e.g., to maintain an IP address during a handover, and service continuity can be supported for some other application at the application layer. In view of this, an on-demand mobility support has been proposed in the 3GPP.

The concept of an on-demand mobility support has been defined in the 3GPP TR 23.799, that is, the network provides different mobility supports according to different characteristics of the user equipment and the services.

However a drawback in the prior art lies in that there has been absent so far a solution to an on-demand mobility support.

SUMMARY

Embodiments of the application provide a method and apparatus for determining mobility management support required by and to be provided to a user equipment, and a method and apparatus for processing mobility management support, so as to provide a solution which can determine and manage an on-demand mobility support.

An embodiment of the application provides a method for determining mobility management support required by and to be provided to a user equipment, the method including:

determining mobility management related information of the user equipment or mobility related information of the user equipment;

determining a mobility management mapping for the user equipment according to the mobility management related information, or determining a mobility mapping for the user equipment according to the mobility related information, wherein the mobility management mapping is a mapping between a condition that the user equipment associated with, and a desired mobility support level, or between a condition that the user equipment associated with, and mobility management mechanism, and the mobility mapping is a mapping between the condition that the user equipment associated with, and a mobility level of the user equipment; and determining the mobility support level or the mobility management mechanism to be provided to the user equipment, according to the mobility management mapping for the user equipment, or determining the mobility support level or the mobility management mechanism to be provided to the user equipment, according to the condition that the user equipment associated with, and the mobility mapping for the user equipment.

Optionally the mobility management related information of the user equipment, or the mobility related information of the user equipment includes one or a combination of the following information:

a user equipment type, an SIM card type, a subscribed service type, a period of time in which the user equipment is operating, a site where the user equipment is located, user setting on the user equipment, a state of the user equipment in a network, and a service requested by the user equipment.

Optionally the mobility management mapping or the mobility mapping is generated from one or a combination of the following information:

a user equipment type, an SIM card type, a subscribed service type, a mobility rule of the user equipment, a communication model of the user equipment, and a network operating strategy.

Optionally the mobility management mapping includes:

the subscribed service type is an IMS voice/video service, the user equipment type is a smart phone, and desired mobility management is a higher mobility support level; or the subscribed service type is small data transmission, the user equipment type is a machine communication user equipment, and desired mobility management is a mobility-limited support level; or the communication mode of the user equipment is an always-online state, and desired mobility management has no position management function to be provided; or the communication mode of the user equipment is to support only unidirectional data initiated by the user equipment, and desired mobility management has no paging function to be provided; or the user equipment operates in a specific movement area or a specific period of time or a limited movement range, and desired mobility management is a mobility-limited support level and has a local mobility anchor available.

Optionally the condition that the user equipment associated with includes one or a combination of the following information:

a user equipment type, a period of time in which the user equipment is operating, a site where the user equipment is located, user setting on the user equipment, a state of the user equipment in a network, and a service requested by the user equipment.

Optionally determining the mobility support level or the mobility management mechanism to be provided to the user equipment according to the mobility management mapping for the user equipment includes:

determining the condition that the user equipment associated with according to the mobility related information of the user equipment; and determining the mobility support level or the mobility management mechanism of the user equipment from the mobility management mapping for the user equipment according to the condition that the user equipment associated with.

Optionally determining the mobility support level or the mobility management mechanism to be provided to the user equipment according to the condition that the user equipment associated with, and the mobility mapping for the user equipment includes:

determining the condition that the user equipment associated with according to the mobility related information of the user equipment;

determining the mobility level of the user equipment according to the condition and the mobility mapping for the user equipment; and determining the mobility support level or the mobility management mechanism to be provided to the user equipment according to an attribute of the user equipment, and the mobility level of the user equipment.

Optionally the mobility management mapping for the user equipment is stored in subscription information of the user equipment, or network configuration information; or the mobility mapping for the user equipment is stored in subscription information of the user equipment, or network configuration information.

Optionally the method further including: updating and/or adjusting, by an operator or a network, the mobility management mapping or the mobility mapping for the user equipment; and/or after the mobility support level or the mobility management mechanism to be provided to the user equipment is determined, the method further comprises: updating and/or adjusting, by an operator or a network, the mobility support level or the mobility management mechanism.

Optionally the mobility level includes one of:

no mobility, limited mobility, low mobility, unlimited mobility, and mobility without tracking any position.

Optionally after the mobility support level or the mobility management mechanism to be provided to the user equipment is determined, the method further includes:

transmitting an instruction to a device for providing a mobility management support for the user equipment according to the mobility support level or the mobility management mechanism.

Optionally the device for providing a mobility management support for the user equipment according to the mobility support level or the mobility management mechanism is determined according to a mobility management sub-function to provide a service, and/or the positions of respective mobility management sub-functions.

Optionally the mobility management sub-function to provide a service includes one or a combination of handover control, position registration, and paging.

Optionally the positions of the respective mobility management sub-functions place in an RAN or a CN.

An embodiment of the application provides a method for processing mobility management, and as illustrated, the method including:

receiving an instruction to provide a mobility support level or a mobility management mechanism for a user equipment; and providing corresponding mobility management for the user equipment in response to the instruction.

An embodiment of the application provides an apparatus for determining mobility management support required by and to be provided to a user equipment, the apparatus including:

an information determining module configured to determine mobility management related information of the user equipment or mobility related information of the user equipment;

a mapping module configured to determine a mobility management mapping for the user equipment according to the mobility management related information, or to determine a mobility mapping for the user equipment according to the mobility related information, wherein the mobility management mapping is a mapping between a condition that the user equipment associated with, and a desired mobility support level, or between a condition that the user equipment associated with, and mobility management mechanism, and the mobility mapping is a mapping between the condition that the user equipment associated with, and a mobility level of the user equipment; and a determining module configured to determine the mobility support level or the mobility management mechanism to be provided to the user equipment, according to the mobility management mapping for the user equipment, or to determine the mobility support level or the mobility management mechanism to be provided to the user equipment, according to the condition that the user equipment associated with, and the mobility mapping for the user equipment.

Optionally the information determining module is further configured to determine the mobility management related information of the user equipment, or the mobility related information of the user equipment including one or a combination of the following information:

a user equipment type, an SIM card type, a subscribed service type, a period of time in which the user equipment is operating, a site where the user equipment is located, user setting on the user equipment, a state of the user equipment in a network, and a service requested by the user equipment.

Optionally the mapping module is further configured to apply the mobility management mapping or the mobility mapping generated from one or a combination of the following information:

a user equipment type, an SIM card type, a subscribed service type, a mobility rule of the user equipment, a communication model of the user equipment, and a network operating strategy.

Optionally the mapping module is further configured to apply the mobility management mapping including one of the following mapping relationships:

the subscribed service type is an IMS voice/video service, the user equipment type is a smart phone, and desired mobility management is a higher mobility support level; or the subscribed service type is small data transmission, the user equipment type is a machine communication user equipment, and desired mobility management is a mobility-limited support level; or the communication mode of the user equipment is an always-online state, and desired mobility management has no position management function to be provided; or the communication mode of the user equipment is to support only unidirectional data initiated by the user equipment, and desired mobility management has no paging function to be provided; or the user equipment operates in a specific movement area or a specific period of time or a limited movement range, and desired mobility management is a mobility-limited support level and has a local mobility anchor available.

Optionally the mapping module is further configured to apply the condition that the user equipment associated with including one or a combination of the following information:

a user equipment type, a period of time in which the user equipment is operating, a site where the user equipment is located, user setting on the user equipment, a state of the user equipment in a network, and a service requested by the user equipment.

Optionally when the determining module determines the mobility support level or the mobility management mechanism to be provided to the user equipment according to the mobility management mapping for the user equipment, the determining module is further configured to determine the condition that the user equipment associated with according to the mobility related information of the user equipment; and to determine the mobility support level or the mobility management mechanism of the user equipment from the mobility management mapping for the user equipment according to the condition that the user equipment associated with.

Optionally when the determining module determines the mobility support level or the mobility management mechanism to be provided to the user equipment according to the condition that the user equipment associated with, and the mobility mapping for the user equipment, the determining module is further configured to determine the condition that the user equipment associated with according to the mobility related information of the user equipment; to determine the mobility level of the user equipment according to the condition and the mobility mapping for the user equipment; and to determine the mobility support level or the mobility management mechanism to be provided to the user equipment according to an attribute of the user equipment, and the mobility level of the user equipment.

Optionally the mapping module is further configured to determine the mobility management mapping for the user equipment, or the mobility mapping for the user equipment in subscription information of the user equipment, or network configuration information.

Optionally the mapping module is further configured to update and/or adjust the mobility management mapping or the mobility mapping for the user equipment through an operator or a network; and/or to update and/or adjust the mobility support level or the mobility management mechanism through an operator or a network after the mobility support level or the mobility management mechanism to be provided to the user equipment is determined.

Optionally the mapping module is further configured to apply the mobility level including one of: no mobility, limited mobility, low mobility, unlimited mobility, and mobility without tracking any position.

Optionally the apparatus further includes:

an indicating module configured to transmit an instruction to a device for providing a mobility management support for the user equipment according to the mobility support level or the mobility management mechanism after the mobility support level or the mobility management mechanism to be provided to the user equipment is determined.

Optionally the indicating module is further configured to determine the device for providing a mobility management support for the user equipment according to the mobility support level or the mobility management mechanism, according to a mobility management sub-function to provide a service, and/or the positions of respective mobility management sub-functions.

Optionally the mobility management sub-function to provide a service includes one or a combination of handover control, position registration, and paging.

Optionally the positions of the respective mobility management sub-functions place in an RAN or a CN.

An embodiment of the application provides an apparatus for processing mobility management, the apparatus including:

a receiving module configured to receive an instruction to provide a mobility support level or a mobility management mechanism for a user equipment; and a managing module configured to provide corresponding mobility management for the user equipment in response to the instruction.

An embodiment of the application provides another apparatus for determining mobility management support required by and to be provided to a user equipment, the apparatus including:

a processor configured to read programs in a memory to perform:

determining mobility management related information of the user equipment or mobility related information of the user equipment;

determining a mobility management mapping for the user equipment according to the mobility management related information, or determining a mobility mapping for the user equipment according to the mobility related information, wherein the mobility management mapping is a mapping between a condition that the user equipment associated with and a desired mobility support level, or between a condition that the user equipment associated with and mobility management mechanism, and the mobility mapping is a mapping between the condition that the user equipment associated with, and a mobility level of the user equipment; and determining the mobility support level or the mobility management mechanism to be provided to the user equipment, according to the mobility management mapping for the user equipment, or determining a mobility support level or a mobility management mechanism to be provided to the user equipment, according to the condition that the user equipment associated with, and the mobility mapping for the user equipment; and a transceiver configured to transmit and receive data under the control of the processor to perform: transmitting an instruction after the mobility support level or the mobility management mechanism to be provided to the user equipment is determined according to the mobility management mapping for the user equipment.

Optionally the processor is further configured to determine the mobility management related information of the user equipment, or the mobility related information of the user equipment including one or a combination of the following information:

a user equipment type, an SIM card type, a subscribed service type, a period of time in which the user equipment is operating, a site where the user equipment is located, user setting on the user equipment, a state of the user equipment in a network, and a service requested by the user equipment.

Optionally the processor is further configured to apply the mobility management mapping or the mobility mapping generated from one or a combination of the following information:

a user equipment type, an SIM card type, a subscribed service type, a mobility rule of the user equipment, a communication model of the user equipment, and a network operating strategy.

Optionally the processor is further configured to apply the mobility management mapping including one of the following mapping relationships:

the subscribed service type is an IMS voice/video service, the user equipment type is a smart phone, and desired mobility management is a higher mobility support level; or the subscribed service type is small data transmission, the user equipment type is a machine communication user equipment, and desired mobility management is a mobility-limited support level; or the communication mode of the user equipment is an always-online state, and desired mobility management has no position management function to be provided; or the communication mode of the user equipment is to support only unidirectional data initiated by the user equipment, and desired mobility management has no paging function to be provided; or the user equipment operates in a specific movement area or a specific period of time or a limited movement range, and desired mobility management is a mobility-limited support level and has a local mobility anchor available.

Optionally the processor is further configured to apply the condition that the user equipment associated with including one or a combination of the following information:

a user equipment type, a period of time in which the user equipment is operating, a site where the user equipment is located, user setting on the user equipment, a state of the user equipment in a network, and a service requested by the user equipment.

Optionally when the processor determines the mobility support level or the mobility management mechanism to be provided to the user equipment according to the mobility management mapping for the user equipment, the processor is further configured: to determine the condition that the user equipment associated with according to the mobility related information of the user equipment; and to determine the mobility support level or the mobility management mechanism of the user equipment from the mobility management mapping for the user equipment according to the condition that the user equipment associated with.

Optionally when the processor determines the mobility support level or the mobility management mechanism to be provided to the user equipment according to the condition that the user equipment associated with, and the mobility mapping for the user equipment, the processor is further configured: to determine the condition that the user equipment associated with according to the mobility related information of the user equipment; to determine the mobility level of the user equipment according to the condition and the mobility mapping for the user equipment; and to determine the mobility support level or the mobility management mechanism to be provided to the user equipment according to an attribute of the user equipment, and the mobility level of the user equipment.

Optionally the processor is further configured to determine the mobility management mapping for the user equipment, or the mobility mapping for the user equipment in subscription information of the user equipment, or network configuration information.

Optionally the processor is further configured to update and/or adjust the mobility management mapping or the mobility mapping for the user equipment through an operator or a network; and/or to update and/or adjust the mobility support level or the mobility management mechanism through an operator or a network after the mobility support level or the mobility management mechanism to be provided to the user equipment is determined.

Optionally the processor is further configured to apply the mobility level including one of: no mobility, limited mobility, low mobility, unlimited mobility, and mobility without tracking any position.

Optionally the processor is further configured:

to transmit an instruction to a device for providing a mobility management support for the user equipment according to the mobility support level or the mobility management mechanism after the mobility support level or the mobility management mechanism to be provided to the user equipment is determined.

Optionally the processor is further configured to determine the device for providing a mobility management support for the user equipment according to the mobility support level or the mobility management mechanism, according to a mobility management sub-function to provide a service, and/or the positions of respective mobility management sub-functions.

Optionally the mobility management sub-function to provide a service includes one or a combination of handover control, position registration, and paging.

Optionally the positions of the respective mobility management sub-functions place in an RAN or a CN.

An embodiment of the application provides another apparatus for processing mobility management, the apparatus including:

a processor configured to read programs in a memory to perform: providing corresponding mobility management for the user equipment in response to an instruction; and a transceiver configured to receive and transmit data under the control of the processor to perform: receiving the instruction to provide a mobility support level or a mobility management mechanism for a user equipment.

Advantageous effects of the application are as follows.

In the solutions according to the embodiments of the application, in order to determine a desired mobility management support to be provided to a user equipment, a mobility management mapping or a mobility mapping for the user equipment is predetermined according to mobility management or mobility related information of the user equipment, where the mapping indicates a mobility support level or a mobility management mechanism to be provided under a condition that the user equipment associated with, and a mobility support level or a mobility management mechanism to be provided to the user equipment is further determined according to the mobility management mapping or the mobility mapping for the user equipment.

Furthermore after the mobility support level or the mobility management mechanism is determined, an instruction including the mobility support level or the mobility management mechanism is provided to a related device entity for providing a mobility support, during the process of providing mobility management to the user equipment.

The related device entity for providing a mobility support provides mobility management to the user equipment in response to the instruction upon reception of the instruction.

In summary, the solutions according to the embodiments of the application can enable on-demand mobility management.

BRIEF DESCRIPTION OF THE DRAWINGS

The drawings to be described here are intended to provide further understanding of the application, and constitute a part of the specification, and the exemplary embodiments of the application, and the description thereof are intended to illustrate the application, but not to limit the application unduly.

DETAILED DESCRIPTION OF THE EMBODIMENTS

In a next-generation network supporting various services and various types of user equipment, on-demand mobility management has become one of crucial technologies to improve the utilization efficiency of network resources. However there has been absent so far a related technology of on-demand mobility management in the network. Accordingly the embodiments of the application propose a solution to on-demand mobility management. Specific embodiments of the application will be described below with reference to the drawings.

In the following description, implementations at an information server and the network side, and at the information server and the user equipment side will be described, where a process of creating information by the information server, a process of providing mobility management on demand at the network side, and a process of providing mobility management for the user equipment side will be described by way of an example, and then an implementation with cooperation of the information server, the network side and the user equipment side will be described by way of an example for better understanding of an implementation of the solution according to the embodiments of the application. This description will not suggest required cooperation of the information server, the network side and the user equipment side for an implementation, or a required implementation at the information server, the network side, or the user equipment side separately, but in fact, problems present respectively at the information server and the network side will also be addressed in the separate implementations at the information server and the network side, and at the information server and the user equipment side, although a better technical effect can be achieved in the implementation with cooperation of the information server, the network side and the user equipment side.

Figure 1:
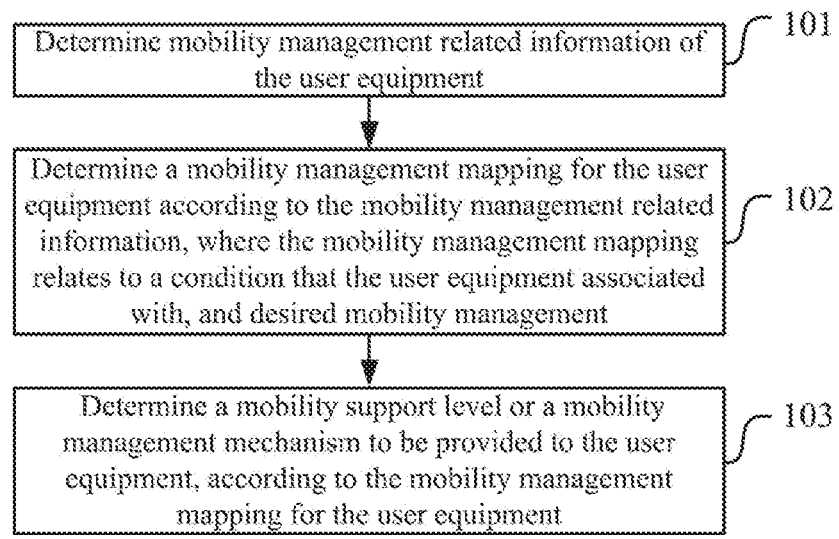
FIG. 1 is a schematic flow chart of a method for determining and providing mobility management support required by a user equipment according to an embodiment of the application

FIG. 1 is a schematic flow chart of a method for determining mobility management support required by and to be provided to a user equipment according to an embodiment of the application, and as illustrated, the method may include the following operations.

The operation 101 is to determine mobility management related information of the user equipment.

The operation 102 is to determine a mobility management mapping for the user equipment according to the mobility management related information, where the mobility management mapping relates to a condition that the user equipment associated with, and desired mobility management.

The operation 103 is to determine a mobility support level or a mobility management mechanism to be provided to the user equipment, according to the mobility management mapping for the user equipment.

The operations in FIG. 1 can be performed as follows for mobility related information.

The operation 101 is to determine mobility related information of a user equipment.

The operation 102 is to determine a mobility mapping for the user equipment according to the mobility related information, where the mobility mapping is a mapping between a condition that the user equipment associated with, and a mobility level of the user equipment.

The operation 103 is to determine a mobility support level or a mobility management mechanism to be provided to the user equipment, according to a condition that the user equipment associated with, and the mobility mapping for the user equipment.

In an implementation, mobility management generally refers to such a service to be provided by a network for the user equipment that is determined by the network; and mobility refers to such a mobility attribute of the user equipment that describes the user equipment, and is determined by a mobility behavior of the user equipment.

The mobility management mapping generally refers to a mapping between a condition that the user equipment associated with, and a mobility support level or a mobility management mechanism to be provided by the network for the user equipment.

The mobility mapping refers to a mapping between a condition that the user equipment associated with, and a mobility level of the user equipment.

Specifically the mobility management mapping may also be determined according to the mobility mapping relationship.

In an implementation, a mobility management level or mechanism to be provided to the user equipment shall be determined according to the mobility mapping taking a condition that the user equipment associated with into account because the "mobility management mapping relationship" is a single table entry, and after the "mobility management mapping relationship" is determined, the network can determine a mobility management level or a mobility management mechanism directly. For details thereof, reference can be made to the following description of the mobility management mapping relationship, for example, a subscribed service type is set to an IMS voice/video service, a type of a user equipment is a smart phone, and desired mobility management is a higher mobility support level.

When a mobility management level or a mobility management mechanism is determined according to the mobility mapping relationship, the mobility mapping is only one of factors to be taken into account, and the network may further take other factors of the user equipment into account, e.g., attributes of the user equipment, etc., which can particularly include the user equipment type, a continuity of a service on the user equipment, a user subscription of the user equipment, etc.

Figure 2:
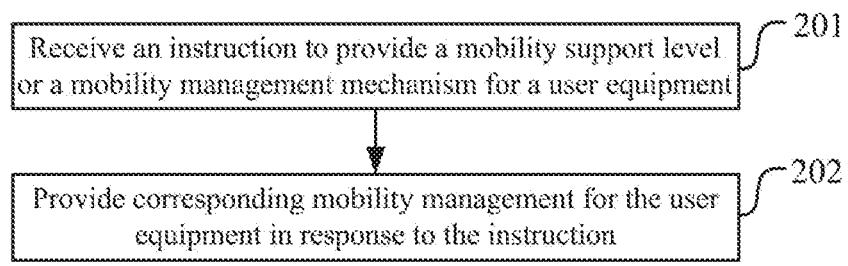
FIG. 2 is a schematic flow chart of a method for processing mobility management according to an embodiment of the application

FIG. 2 is a schematic flow chart of a method for processing mobility management, and as illustrated, the method may include the following operations.

The operation 201 is to receive an instruction to provide a mobility support level or a mobility management mechanism for a user equipment.

The operation 202 is to provide corresponding mobility management for the user equipment in response to the instruction.

In an implementation, mobility management related information of the user equipment, or mobility related information of the user equipment can include one or a combination of the following information: a user equipment type, an SIM card type, a subscribed service type, a period of time in which the user equipment is operating, a site where the user equipment is located, user setting on the user equipment, a state of the user equipment in a network, and a service requested by the user equipment.

In an implementation, a mobility management mapping or a mobility mapping can be generated from one or a combination of the following information: a user equipment type, an SIM card type, a subscribed service type, a mobility rule of the user equipment, a communication model of the user equipment, and a network operating strategy.

In an implementation, when the mobility management mapping is generated from the information above, the mobility management mapping can be one of the following mapping relationships: the subscribed service type is an IMS voice/video service, the user equipment type is a smart phone, and desired mobility management is a higher mobility support level; or the subscribed service type is small data transmission, the user equipment type is a machine communication user equipment, and desired mobility management is a mobility-limited support level; or the communication mode of the user equipment is an always-online state, and desired mobility management has no position management function to be provided; or the communication mode of the user equipment is to support only unidirectional data initiated by the user equipment, and desired mobility management has no paging function to be provided; or the user equipment operates in a specific movement area or a specific period of time or a limited movement range, and desired mobility management is a mobility-limited support level and has a local mobility anchor available.

In an implementation, the condition that the user equipment associated with can one or a combination of the following information: a user equipment type, a period of time in which the user equipment is operating, a site where the user equipment is located, user setting on the user equipment, a state of the user equipment in a network, and a service requested by the user equipment.

In an implementation, determining the mobility support level or the mobility management mechanism to be provided to the user equipment according to the mobility management mapping for the user equipment includes: determining the condition that the user equipment associated with according to mobility related information of the user equipment; and determining the mobility support level or the mobility management mechanism of the user equipment from the mobility management mapping for the user equipment according to the condition that the user equipment associated with.

In an implementation, determining the mobility support level or the mobility management mechanism to be provided to the user equipment according to the condition that the user equipment associated with, and the mobility mapping for the user equipment comprises: determining the condition that the user equipment associated with according to the mobility related information of the user equipment; determining the mobility level of the user equipment according to the condition and the mobility mapping for the user equipment; and determining the mobility support level or the mobility management mechanism to be provided to the user equipment according to an attribute of the user equipment, and the mobility level of the user equipment.

In an implementation, the mobility management mapping for the user equipment can be stored in subscription information of the user equipment, or network configuration information; or the mobility mapping for the user equipment can be stored in subscription information of the user equipment, or network configuration information.

In an implementation, the method further includes: updating and/or adjusting, by an operator or a network, the mobility management mapping or the mobility mapping for the user equipment; and/or, after the mobility support level or the mobility management mechanism to be provided to the user equipment is determined, the method further includes: updating and/or adjusting, by an operator or a network, the mobility support level or the mobility management mechanism.

In a particular implementation, when the mobility support level or the mobility management mechanism is updated and/or adjusted by the operator or the network, the mobility management mapping for the user equipment can be updated and/or adjusted by the operator or the network, and particularly the mobility management mapping for the user equipment stored in the network can be updated or adjusted according to a user equipment type of the user equipment, an SIM card type, a subscribed service type, a mobility rule of the user equipment, a communication model of the user equipment, and a network operating strategy, etc.

In a particular implementation, when the mobility support level or the mobility management mechanism is updated and/or adjusted by the operator or the network, the mobility management mapping relates to a condition that the user equipment associated with, and a desired mobility support level or mobility management mechanism as needed in reality, but after the mobility support level or the mobility management mechanism to be provided to the user equipment is determined according to the mobility management mapping relationship, it can be further modified or adjusted as needed in reality, and particularly it can be modified directly by the operator or the network, e.g., modifying the mobility support level or the mobility management mechanism to be provided to the user equipment through a strategy control function in a network operating system.

In an implementation, the mobility level of the user equipment can include one of the following information: no mobility, limited mobility, low mobility, and unlimited mobility.

In an implementation, after the mobility support level or the mobility management mechanism to be provided to the user equipment is determined, the method can further include the following operation: transmitting an instruction to a device for providing a mobility management support for the user equipment according to the mobility support level or the mobility management mechanism.

Particularly after the mobility support level or the mobility management mechanism is determined on a device for determining the level or the mechanism, it can instruct a particular device for providing a mobility management support service on a RAN or an CN to enforce the level or the mechanism to thereby provide a desired mobility support for the user equipment; and it can instruct the particular device for providing a mobility management support to provide a mobility support, so a particular instruction pattern and items can be set as needed in reality as can readily occur to those skilled in the art.

In an implementation, the device for providing the mobility management support for the user equipment according to the mobility support level or the mobility management mechanism is determined according to a mobility management sub-function to provide a service, and/or the positions of respective mobility management sub-functions.

In an implementation, the mobility management sub-function to provide a service includes one or a combination of the following functions: handover control, position registration, and paging.

In an implementation, the positions of the respective mobility management sub-functions placed in a Radio Access Network (RAN) or a Core Network (CN).

In a particular implementation: an operator to accept a subscription of a subscriber determines a mobility support level of the initial subscription of the subscriber of the user equipment according to a user equipment type, a Subscriber Identity Module (SIM) card type, a subscribed service type, etc., and writes subscription information. And subsequently digs data from a movement locus of the user equipment, obtains a mobility rule of the user equipment, and modifies and stores the mobility support level of the subscription of the user equipment.

When the user equipment accesses the network, the network side seeks the mobility support levels of the subscriptions stored in the subscription information to obtain the current mobility support level of the user equipment according to information about a service requested by the user equipment, and position information of the user equipment, and determines a corresponding mobility management function to provide the service for the user equipment, according to the obtained mobility support level.

The following description will be further given in details by way of an example, and although the description of the particular embodiments generally relates to a mobility management mapping relationship, for example, those skilled in the art shall readily devise a corresponding solution relating to a mobility mapping according to commonalities and differences between the mobility management mapping and the mobility mapping relationship.

The first embodiment relates to a mobility management level in subscription information.

Mobility support levels or mobility management mechanisms for subscription in a future 5G network are defined, for example, as Level I, Level II, Level III, Centralized MM, Distributed MM, etc.

An operator to accept a subscription of a subscriber determines a mobility support level of the initial subscription of the subscriber of a user equipment according to a user equipment type, a subscribed service, etc., and writes subscription information, and for example, the operator writes a higher mobility support level for a smart phone subscribing to an IP Multimedia Sub-system (IMS) voice/video service, and writes a mobility-limited support level for a machine communication user equipment subscribing to small data transmission, as depicted in Table 4-1 below.

TABLE 4-1

| Mobility support level or mobility management mechanism of initial subscription | | | |
|---|---|---|---|
| Mobility level) | Area | Session continuity | Applicable MM scheme |
| Level I | PLMN ID = m, n | —(no UP, no small data) | CMM (Centralized MM with centralized MA) without UP MA |
| Level VII | PLMN ID = m, n | no | CMM with LMA relocation |
| Level VIII | PLMN ID = m, n | yes | CMM without LMA relocation For an operator service, centralized MA is required |

The abbreviations in the table are defined as follows: the PLMN stands for a Public Land Mobile Network; the CMM stands for Centralized Mobility Management; the MM stands for Mobility Management, the MA stands for a Mobility Anchor; the UP stands for a User Plane; and the LMA stands for a Local Mobility Anchor.

Furthermore the operator further determines the mobility support level or the mobility management mechanism of the user equipment taking a communication mode of the user equipment into account, and for example, the user equipment is always online, the user equipment only supports unidirectional data transmission (e.g., Mobile Originated (MO) only), the user equipment operates in an offline data transmission mode, the user equipment operates in a roaming access mode, etc. Taking into account the communication mode of the user equipment, the user equipment is provided with different position management in the mobility management mechanism finally applied to the user equipment, and for example, no position management function is provided for the always-online user equipment, and no paging function is provided for the user equipment only supporting unidirectional data transmission (MO only). Accordingly the subscription of the user equipment may include the communication mode or information about a position management scheme. Furthermore there may be a number of communication modes of the user equipment, and different communication modes or position management schemes can be applied to the user equipment in different scenarios, e.g., in different periods of time, at different sites, or based upon different user setting, so the subscription of the user equipment may further include information about the communication modes or the position management schemes in the different communication scenarios.

In a subsequent operating process, a network operating support system of the operator modifies the possible mobility support level of the user equipment based upon the mobility rule and the service type of the user equipment (for example, if the service type subscribed by the subscriber of the user equipment is changed). Table 4-2 depicts an example of the subscription of a smart phone.

TABLE 4-2

Modified mobility support level or mobility management mechanism of the subscription

| Mobility level | Area | Session continuity | Applicable MM schemes |
|---|---|---|---|
| Level I | PLMN ID = m, n | —(no UP, no small data) | CMM (Centralized MM with centralized MA) without UP MA |
| Level IV | TAI list 1 = a, b, c, d (within a group of RAN nodes) | no | DMM (Distributed MM) with LMA relocation |
| Level V | TAI list 1 = a, b, c, d TAI list 2 = x, y, z (within a group of RAN nodes) | yes | DMM without LMA relocation For operator service, centralized MA is required |
| Level VII | PLMN ID = m, n, except TAI list 1 | no | CMM with LMA relocation |
| Level VIII | PLMN ID = m, n, except TAI list 1, 2 | yes | CMM without LMA relocation For operator service, centralized MA is required |

Second Embodiment

The current mobility support level or mobility management mechanism of an accessing user equipment is determined.

When the user equipment accesses a network, a mobility support level determining function in the network needs to determine the current mobility support level or mobility management mechanism provided to the user equipment, and in this process, the network needs to obtain a description of a service requested by the user equipment, the position of the user equipment, and subscription information of the user equipment.

Figure 3:
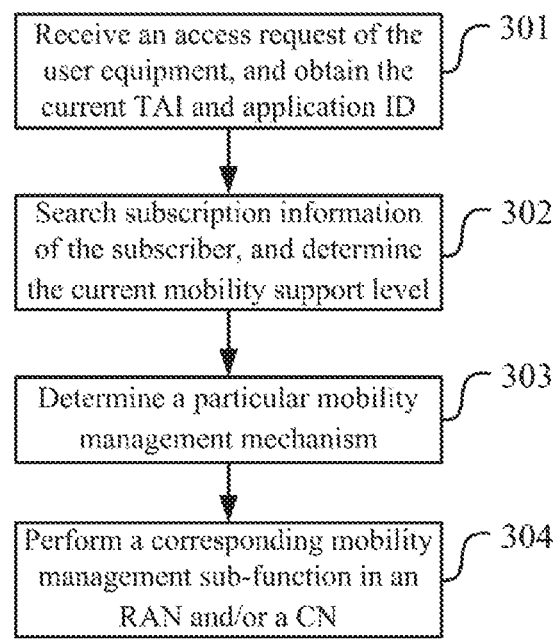
FIG. 3 is a schematic flow chart of determining the current mobility support level of a user equipment according to an embodiment of the application

FIG. 3 is a schematic flow chart of determining the current mobility support level of the user equipment, and as illustrated, the flow can include the following operations.

The operation 301 is to receive an access request of the user equipment, and to obtain the current Track Area ID (TAI) and application ID.

The operation 302 is to search subscription information of the subscriber, and to determine the current mobility support level or mobility management mechanism.

The operation 303 is to determine a particular mobility management mechanism.

The operation 304 is to perform a corresponding mobility management sub-function in a Radio Access Network (RAN) and/or a Core Network (CN).

A mobility support level determining function searches mobility support levels or mobility management mechanisms of subscriptions in subscription information of the user equipment for a corresponding mobility support level or mobility management mechanism according to a description of a service requested by the user equipment, and/or the position of the user equipment, so that the mobility support level determining function can determine a mobility management mechanism, and subsequently provide the service for the user equipment, e.g., handover management, position management, etc., using respective related control-plane mobility management sub-functions.

If the accessing user equipment is only registered with the control plane without requesting for any service, that is, neither requests for setting up a user-plane connection nor requests for transmitting small data, then the mobility support level determining function may determine a mobility support level thereof directly or according to potential mobility support levels in the subscription.

Furthermore if the subscription information includes information about a communication mode or a position management scheme of the user equipment, then the network will further determine the mobility support level or the mobility management mechanism according to the information; or if the subscription information includes a number of communication modes or position management schemes of the user equipment, then the network will further obtain the current communication of the user equipment, and determine a position management function in final mobility management according to the current communication model of the user equipment.

Third Embodiment

When a user equipment which has accessed requests for a new service, the current mobility support level and/or mobility management mechanism of the user equipment is determined.

If the user equipment is currently only registered with the control plane without accessing any service, then a mobility support level determining function in a network will obtain a description of the service requested by the user equipment, and/or the position of the user equipment, search mobility support levels or mobility management mechanisms of subscriptions in subscription information of the user equipment for a corresponding mobility support level or mobility management mechanism, and determine a particular mobility management mechanism. Thereafter the user equipment is served only in the mobility management mechanism.

If the user equipment currently has accessed a service, then the mobility support level determining function in the network will obtain a description of the service requested by the user equipment, and/or the position of the user equipment, search mobility support levels or mobility management mechanisms of subscriptions in subscription information of the user equipment for a corresponding mobility support level or mobility management mechanism, and determine a particular mobility management mechanism. If the user equipment has been served in the mobility management mechanism, then the user equipment will still be served in the existing mobility management mechanism; otherwise, the user equipment will be served in the mobility management mechanism, that is, the user equipment will be served concurrently in a plurality of mobility management mechanisms.

Fourth Embodiment

When a user equipment is handed over, or the position thereof is updated, the current mobility support level or mobility management mechanism of the user equipment is determined.

Figure 4:
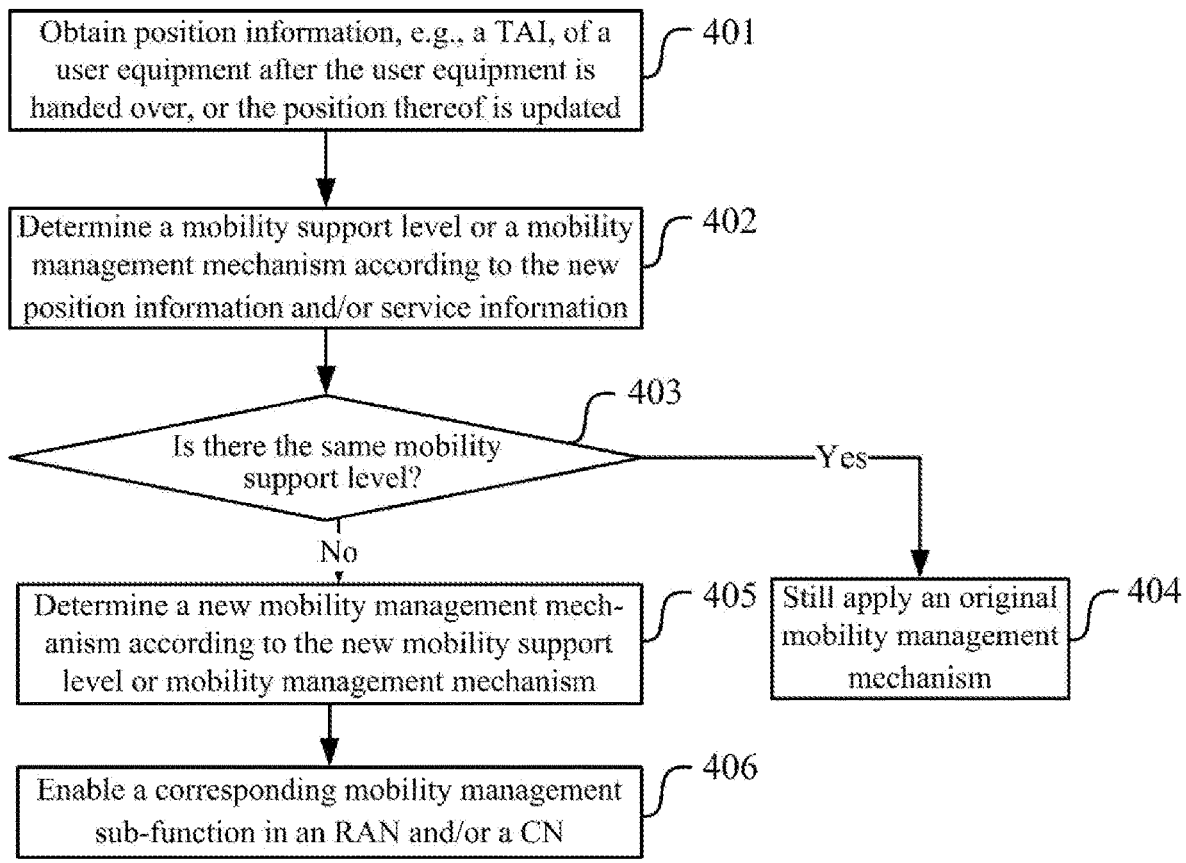
FIG. 4 is a schematic flow chart of determining the current mobility support level of a user equipment after the position of the user equipment is changed according to an embodiment of the application

FIG. 4 is a schematic flow chart of determining the current mobility support level of a user equipment after the position of the user equipment is changed, and as illustrated, the flow can include the following operations.

The operation 401 is to obtain position information, e.g., a TAI, of a user equipment after the user equipment is handed over, or the position thereof is updated.

The operation 402 is to determine a mobility support level or a mobility management mechanism according to the new position information and/or service information.

The operation 403 is to determine whether there is the same mobility support level, and if so, to proceed to the operation 404; otherwise, to proceed to the operation 405.

The operation 404 is to still apply an original mobility management mechanism.

The operation 405 is to determine a new particular mobility management mechanism according to the new mobility support level or mobility management mechanism.

The operation 406 is to enable a corresponding mobility management sub-function in an RAN and/or a CN.

After the terminal is handed over, or the position thereof is updated, a mobility support level determining function in a network obtains the position of the user equipment after the handover, and furthermore obtains the current mobility support level and/or particular mobility management mechanism of the user equipment according to information about a service accessed by the user equipment.

Fifth Embodiment

A particular mobility management mechanism is determined according to a determined mobility support level or mobility management mechanism.

Figure 5:
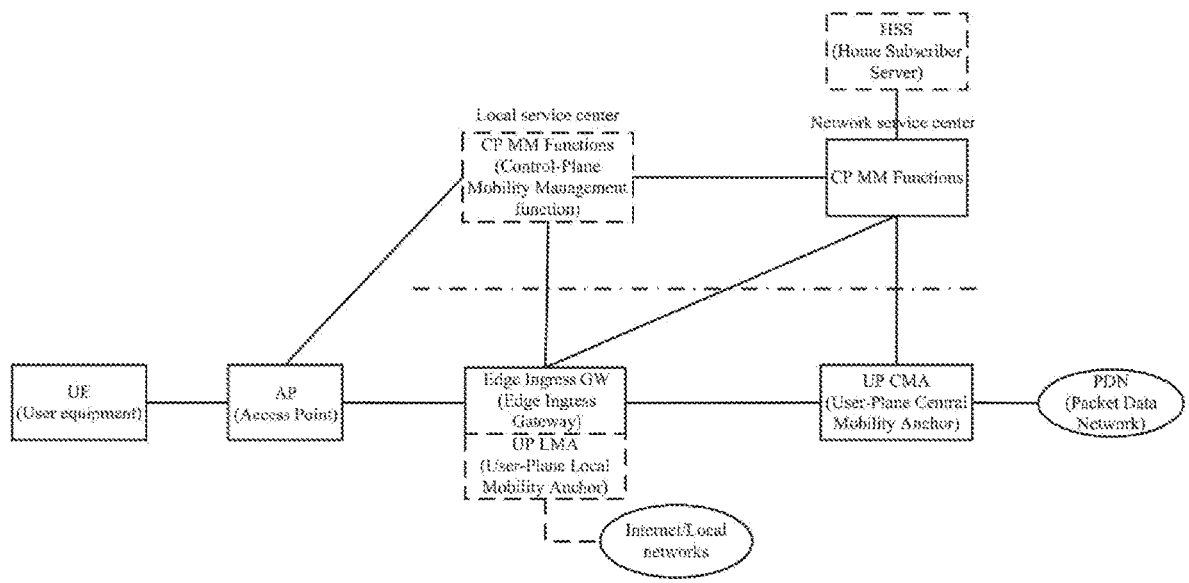
FIG. 5 is a schematic diagram of mobility management functions distributed in an on-demand mobility management mechanism according to an embodiment of the application

FIG. 5 is a schematic diagram of mobility management functions distributed in an on-demand mobility management mechanism according to an embodiment of the application, and after a mobility support level determining function in a network determines the current mobility support level or mobility management mechanism of a user equipment, it determines an appropriate mobility management mechanism, and finally determines mobility management sub-functions to provide a service, e.g., handover control, position registration, paging, etc., and determines the positions of the respective mobility management sub-functions, e.g., in a Radio Access Network (RAN) or a Core Network (CN). For example, in the architecture as illustrated in FIG. 5, a control-plane mobility management sub-function can be located in a local service center or a network service center, and a mobility anchor can be embodied as a local mobility anchor or a central mobility anchor. If the mobility management mechanism determined by the mobility support level determining function in the network according to the current mobility support level or mobility management mechanism of the user equipment requires a mobility management sub-function at the RAN side to provide a service, but no related service is deployed at the RAN side of the network, for example, the local service center as illustrated in FIG. 5 is not deployed, then the mobility support level determining function shall be able to adjust the mobility management mechanism to perform a corresponding mobility management function in the core network.

Based upon the same inventive idea, embodiments of the application further provide an apparatus for providing a mobility management support, and an apparatus for processing mobility management, and since these apparatuses address the problem under a similar principle to the method providing a mobility management support, and the method for processing mobility management, reference can be made to the implementations of the methods for implementations of these apparatuses, and a repeated description thereof will be omitted here.

Figure 6:
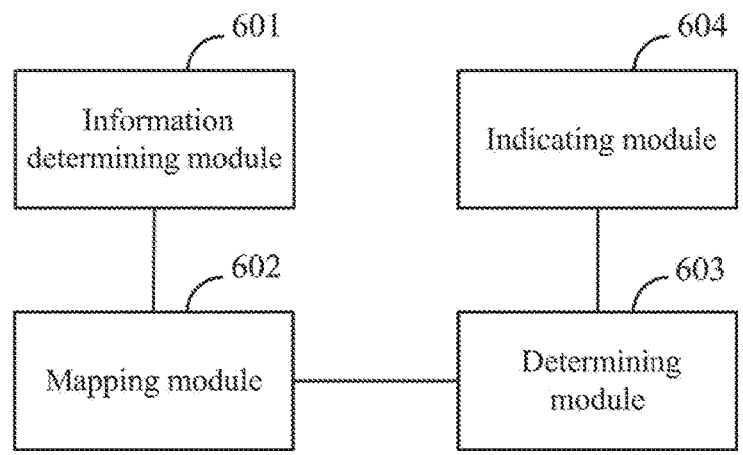
FIG. 6 is a schematic structural diagram of an apparatus for determining and providing mobility management support required by a user equipment according to an embodiment of the application

FIG. 6 is a schematic structural diagram of an apparatus for determining mobility management support required by and to be provided to a user equipment according to an embodiment of the application, and as illustrated, the apparatus can include: an information determining module 601 configured to determine mobility management related information of the user equipment or mobility related information of the user equipment; a mapping module 602 configured to determine a mobility management mapping for the user equipment according to the mobility management related information, or to determine a mobility mapping for the user equipment according to the mobility related information, where the mobility management mapping is a mapping between a condition that the user equipment associated with, and a desired mobility support level, or between a condition that the user equipment associated with and mobility management mechanism, and the mobility mapping is a mapping between the condition that the user equipment associated with, and a mobility level of the user equipment; and a determining module 603 configured to determine a mobility support level or a mobility management mechanism to be provided to the user equipment, according to the mobility management mapping for the user equipment, or to determine a mobility support level or a mobility management mechanism to be provided to the user equipment, according to the condition that the user equipment associated with, and the mobility mapping for the user equipment.

In an implementation, the information determining module is further configured to determine the mobility management related information of the user equipment, or the mobility related information of the user equipment including one or a combination of the following information.

A user equipment type, an SIM card type, a subscribed service type, a period of time in which the user equipment is operating, a site where the user equipment is located, user setting on the user equipment, a state of the user equipment in a network, and a service requested by the user equipment.

In an implementation, the mapping module is further configured to apply the mobility management mapping or the mobility mapping generated from one or a combination of the following information.

A user equipment type, an SIM card type, a subscribed service type, a mobility rule of the user equipment, a communication model of the user equipment, and a network operating strategy.

In an implementation, the mapping module is further configured to apply the mobility management mapping including one of the following mapping relationships: the subscribed service type is an IMS voice-video service, the user equipment type is a smart phone, and desired mobility management is a higher mobility support level; or the subscribed service type is small data transmission, the user equipment type is a machine communication user equipment, and desired mobility management is a mobility-limited support level; or the communication mode of the user equipment is an always-online state, and desired mobility management has no position management function to be provided; or the communication mode of the user equipment is to support only unidirectional data initiated by the user equipment, and desired mobility management has no paging function to be provided; or the user equipment operates in a specific movement area or a specific period of time or a limited movement range, and desired mobility management is a mobility-limited support level and has a local mobility anchor available.

In an implementation, the mapping module is further configured to apply the condition that the user equipment associated with including one or a combination of the following information.

A user equipment type, a period of time in which the user equipment is operating, a site where the user equipment is located, user setting on the user equipment, a state of the user equipment in a network, and a service requested by the user equipment.

In an implementation, when the determining module determines the mobility support level or the mobility management mechanism to be provided to the user equipment according to the mobility management mapping for the user equipment, the determining module is further configured to determine the condition that the user equipment associated with according to the mobility related information of the user equipment; and to determine the mobility support level or the mobility management mechanism of the user equipment from the mobility management mapping for the user equipment according to the condition that the user equipment associated with.

In an implementation, when the determining module determines the mobility support level or the mobility management mechanism to be provided to the user equipment according to the condition that the user equipment associated with, and the mobility mapping for the user equipment, the determining module is further configured to determine the condition that the user equipment associated with according to the mobility related information of the user equipment; to determine the mobility level of the user equipment according to the condition and the mobility mapping for the user equipment; and to determine the mobility support level or the mobility management mechanism to be provided to the user equipment according to an attribute of the user equipment, and the mobility level of the user equipment.

In an implementation, the mapping module is further configured to determine the mobility management mapping for the user equipment, or the mobility mapping for the user equipment in subscription information of the user equipment, or network configuration information.

In an implementation, the mapping module is further configured to update and/or adjust the mobility management mapping or the mobility mapping for the user equipment through an operator or a network; and/or to update and/or adjust the mobility support level or the mobility management mechanism through an operator or a network after the mobility support level or the mobility management mechanism to be provided to the user equipment is determined.

In an implementation, the mapping module is further configured to apply the mobility level including one of: no mobility, limited mobility, low mobility, unlimited mobility, and mobility without tracking any position.

In an implementation, the apparatus can further include: an indicating module 604 configured to transmit an instruction to a device for providing a mobility management support for the user equipment according to the mobility support level or the mobility management mechanism after the mobility support level or the mobility management mechanism to be provided to the user equipment is determined.

In an implementation, the indicating module is further configured to determine the device for providing the mobility management support for the user equipment according to the mobility support level or the mobility management mechanism, according to a mobility management sub-function to provide a service, and/or the positions of respective mobility management sub-functions.

In an implementation, the mobility management sub-function to provide a service includes one or a combination of handover control, position registration, and paging.

In an implementation, the positions of the respective mobility management sub-functions place in an RAN or a CN.

Figure 7:
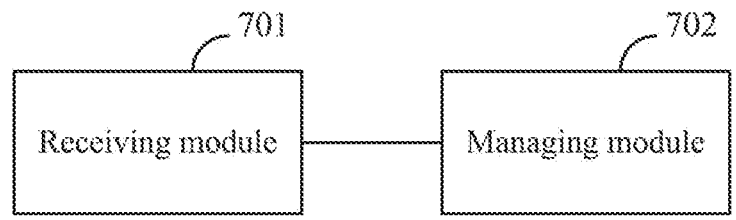
FIG. 7 is a schematic structural diagram of an apparatus for processing mobility management according to an embodiment of the application

FIG. 7 is a schematic structural diagram of an apparatus for processing mobility management, and as illustrated, the apparatus can include: a receiving module 701 configured to receive an instruction to provide a mobility support level or a mobility management mechanism for a user equipment; and a managing module 702 configured to provide corresponding mobility management for the user equipment in response to the instruction.

For the sake of a convenient description, the respective components of the apparatuses above have been described respectively as respective functional modules or units. Of course, the functions of the respective modules or units can be performed in the same item or a plurality of items of software or hardware to put the application into practice.

As can be apparent from the embodiments above, the technical solutions according to the embodiments of the application can be put into practice as follows.

Figure 8:
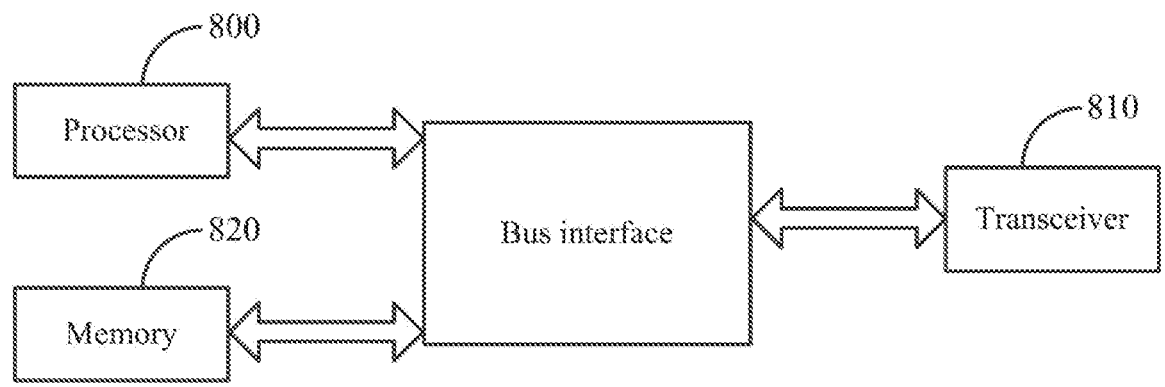
FIG. 8 is a schematic structural diagram of an operator server according to an embodiment of the application

FIG. 8 is a schematic structural diagram of an operator server, and as illustrated, the server includes: a processor 800 configured to read programs in a memory 820 to perform: determining mobility management related information of the user equipment or mobility related information of the user equipment; determining a mobility management mapping for the user equipment according to the mobility management related information, or to determine a mobility mapping for the user equipment according to the mobility related information, where the mobility management mapping is a mapping between a condition that the user equipment associated with and a desired mobility support level, or between a condition that the user equipment associated with and mobility management mechanism, and the mobility mapping is a mapping between the condition that the user equipment associated with, and a mobility level of the user equipment; and determining the mobility support level or the mobility management mechanism to be provided to the user equipment, according to the mobility management mapping for the user equipment, or determining the mobility support level or the mobility management mechanism to be provided to the user equipment, according to the condition that the user equipment associated with, and the mobility mapping for the user equipment; and a transceiver 810 configured to transmit and receive data under the control of the processor 800 to perform: transmitting an instruction after the mobility support level or the mobility management mechanism to be provided to the user equipment is determined according to the mobility management mapping for the user equipment.

In an implementation, the mobility management related information of the user equipment, or the mobility related information of the user equipment includes one or a combination of the following information.

A user equipment type, an SIM card type, a subscribed service type, a period of time in which the user equipment is operating, a site where the user equipment is located, user setting on the user equipment, a state of the user equipment in a network, and a service requested by the user equipment.

In an implementation, the mobility management mapping or the mobility mapping is generated from one or a combination of the following information.

A user equipment type, an SIM card type, a subscribed service type, a mobility rule of the user equipment, a communication model of the user equipment, and a network operating strategy.

In an implementation, the mobility management mapping generated from the information includes: the subscribed service type is an IMS voice/video service, the user equipment type is a smart phone, and desired mobility management is a higher mobility support level; or the subscribed service type is small data transmission, the user equipment type is a machine communication user equipment, and desired mobility management is a mobility-limited support level; or the communication mode of the user equipment is an always-online state, and desired mobility management has no position management function to be provided; or the communication mode of the user equipment is to support only unidirectional data initiated by the user equipment, and desired mobility management has no paging function to be provided; or the user equipment operates in a specific movement area or a specific period of time or a limited movement range, and desired mobility management is a mobility-limited support level and has a local mobility anchor available.

In an implementation, the condition that the user equipment associated with includes one or a combination of the following information.

A user equipment type, a period of time in which the user equipment is operating, a site where the user equipment is located, user setting on the user equipment, a state of the user equipment in a network, and a service requested by the user equipment.

In an implementation, determining the mobility support level or the mobility management mechanism to be provided to the user equipment according to the mobility management mapping for the user equipment comprises: determining the condition that the user equipment associated with according to the mobility related information of the user equipment; and determining the mobility support level or the mobility management mechanism of the user equipment from the mobility management mapping for the user equipment according to the condition that the user equipment associated with.

In an implementation, determining the mobility support level or the mobility management mechanism to be provided to the user equipment according to the condition that the user equipment associated with, and the mobility mapping for the user equipment comprises: determining the condition that the user equipment associated with according to the mobility related information of the user equipment; determining the mobility level of the user equipment according to the condition and the mobility mapping for the user equipment; and determining the mobility support level or the mobility management mechanism to be provided to the user equipment according to an attribute of the user equipment, and the mobility level of the user equipment.

In an implementation, the mobility management mapping for the user equipment, is stored in subscription information of the user equipment, or network configuration information, or the mobility mapping for the user equipment is stored in subscription information of the user equipment, or network configuration information.

In an implementation, the mobility management mapping or the mobility mapping for the user equipment is updated and/or adjusted through an operator or a network; and/or after the mobility support level or the mobility management mechanism to be provided to the user equipment is determined, the mobility support level or the mobility management mechanism is updated and/or adjusted through an operator or a network.

In an implementation, the mobility level of the user equipment includes one of: no mobility, limited mobility, low mobility, unlimited mobility, and mobility without tracking any position.

In an implementation, an instruction is transmitted to a device for providing a mobility management support for the user equipment according to the mobility support level or the mobility management mechanism after the mobility support level or the mobility management mechanism to be provided to the user equipment is determined.

In an implementation, the device for providing a mobility management support for the user equipment according to the mobility support level or the mobility management mechanism is determined according to a mobility management sub-function to provide a service, and/or the positions of respective mobility management sub-functions.

In an implementation, the mobility management sub-function to provide a service includes one or a combination of handover control, position registration, and paging.

In an implementation, the positions of the respective mobility management sub-functions place in an RAN or a CN.

Here in FIG. 8, the bus architecture can include any number of interconnecting buses and bridges to particularly link together various circuits including one or more processors represented by the processor 800, and one or more memories represented by the memory 820. The bus architecture can further link together various other circuits. e.g., a peripheral device, a manostat, a power management circuit, etc., all of which are well known in the art, so a further description thereof will be omitted in this context. The bus interface serves as an interface. The transceiver 810 can be a number of elements, e.g., a transmitter and a receiver, which are units for communication with various other devices over a transmission medium. The processor 800 is responsible for managing the bus architecture and performing normal processes, and the memory 820 can store data for use by the processor 800 in performing operations.

Figure 9:
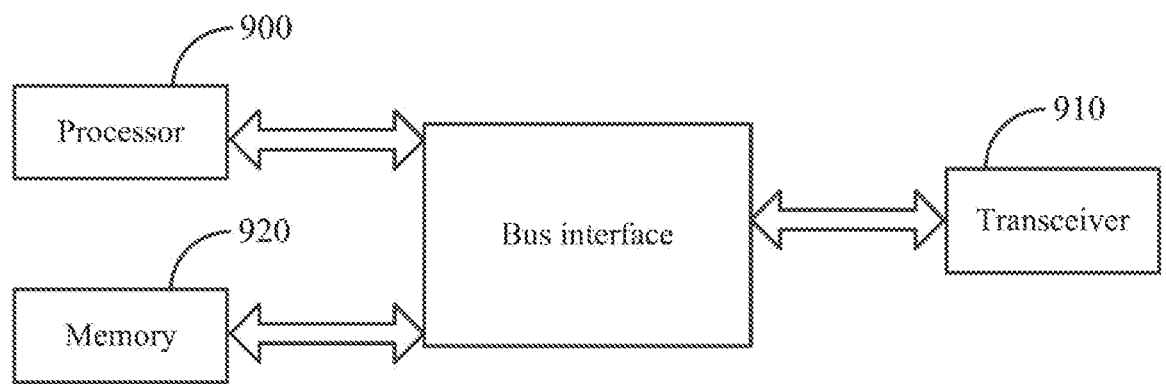
FIG. 9 is a schematic structural diagram of a network-side device according to an embodiment of the application.

FIG. 9 is a schematic structural diagram of a network-side device according to an embodiment of the application, and as illustrated, the network-side device can include: a processor 900 configured to read programs in a memory 902 to perform: providing corresponding mobility management for the user equipment in response to an instruction, and a transceiver 910 configured to receive and transmit data under the control of a processor 900 to perform: receiving the instruction to provide a mobility support level or a mobility management mechanism for a user equipment.

Here in FIG. 9, the bus architecture can include any number of interconnecting buses and bridges to particularly link together various circuits including one or more processors represented by the processor 900, and one or more memories represented by the memory 920. The bus architecture can further link together various other circuits, e.g., a peripheral device, a manostat, a power management circuit, etc., all of which are well known in the art, so a further description thereof will be omitted in this context. The bus interface serves as an interface. The transceiver 910 can be a number of elements, e.g., a transmitter and a receiver, which are units for communication with various other devices over a transmission medium. The processor 900 is responsible for managing the bus architecture and performing normal processes, and the memory 920 can store data for use by the processor 900 in performing operations.

In summary, the embodiments of the application provide at least the following solutions.

A process of on-demand mobility management generally includes: mobility information of a user equipment is obtained, and in a particular implementation, the mobility information may not be provided by the user equipment, but may be obtained from a subscription, e.g., information about a service which can be supported by the UE.

Subscription information and/or network configuration information (e.g., strategy control configuration information) is searched for a mobility support level or a mobility management mechanism of the user equipment according to the mobility information of the user equipment, and in a particular implementation, the mobility information is not used to search mobility support levels of subscriptions, but used to determine the final mobility support level and mobility management mechanism. Stated otherwise, mobility support level or mobility management mechanism information of the subscriptions is searched according to the mobility information of the user equipment, and the mobility support level or the mobility management mechanism to be provided to the user equipment is determined.

A mobility support level for providing a service to the user equipment, and a corresponding mobility management function are determined according to the mobility support level or the mobility management mechanism of a subscription of the user equipment.

Mobility management is performed on the user equipment using the determined mobility management function.

The mobility information of the user equipment can include one or a combination of the following information: position information of the user equipment; the user equipment type; subscribed service information; and requested service information.

In an implementation, the subscribed service information can be obtained in the subscription information. The identifier information of the subscription can be searched from an IMSI, a GUTI, etc.

One or a combination of the following information is recorded in the subscription information of the user equipment: a preset mobility support level or mobility management mechanism of the subscription of the user equipment; and a correspondence list between a subscribed movement range of the user equipment, and a subscribed mobility support level or mobility management mechanism of the user equipment.

The subscription information can further include a correspondence list between information about a movement range of the user equipment and a service subscribed by the user equipment, or a service which can be supported by the user equipment, and a mobility support level or a mobility management mechanism of the user equipment.

The network configuration information can include one or a combination of the following information: a correspondence relationship list between a network area, and a mobility support level or a subscribed mobility management mechanism; and a correspondence relationship list between a network area and a service type, and a mobility support level, or between a network area and a service type, and a mobility management mechanism of the user equipment.

The mobility management function to provide a service to the user equipment is determined particularly as follows: a mobility management function to provide a mobility support to the user equipment, and the position thereof are determined. Particularly they can be determined by a mobility support management functional entity, for example.

The mobility management function can include one or a combination of the following functions: a user equipment registration function; a reachability management function; a handover control function; a position registration function; and a mobility anchor relocating function.

The position of the mobility management function places in one of: an RAN or a CN.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for determining mobility management support required by and to be provided to a user equipment, the method comprising:
  determining mobility management related information of the user equipment or mobility related information of the user equipment;
  determining a mobility management mapping for the user equipment according to the mobility management related information, or determining a mobility mapping for the user equipment according to the mobility related information, wherein the mobility management mapping is a mapping between a condition that the user equipment associated with, and a desired mobility support level, or between a condition that the user equipment associated with, and mobility management mechanism, and the mobility mapping is a mapping between the condition that the user equipment associated with, and a mobility level of the user equipment; and determining the mobility support level or the mobility management mechanism to be provided to the user equipment, according to the mobility management mapping for the user equipment, or determining the mobility support level or the mobility management mechanism to be provided to the user equipment, according to the condition that the user equipment associated with, and the mobility mapping for the user equipment;

wherein the mobility management related information of the user equipment, or the mobility related information of the user equipment comprises one or a combination of following information:

an SIM card type, and a period of time in which the user equipment is operating;

wherein the mobility management mapping or the mobility mapping is generated from a communication model of the user equipment;

wherein the mobility management mapping comprises:

the communication mode of the user equipment is to support only unidirectional data initiated by the user equipment, and desired mobility management has no paging function to be provided.

2. The method according to claim 1, wherein the condition that the user equipment associated with comprises one or a combination of following information:

a user equipment type, a period of time in which the user equipment is operating, a site where the user equipment is located, user setting on the user equipment, a state of the user equipment in a network, and a service requested by the user equipment.

3. The method according to claim 1, wherein determining the mobility support level or the mobility management mechanism to be provided to the user equipment according to the mobility management mapping for the user equipment comprises:

determining the condition that the user equipment associated with according to mobility related information of the user equipment; and determining the mobility support level or the mobility management mechanism of the user equipment from the mobility management mapping for the user equipment according to the condition that the user equipment associated with.

4. The method according to claim 1, wherein the mobility management mapping for the user equipment is stored in subscription information of the user equipment, or network configuration information; or the mobility mapping for the user equipment is stored in subscription information of the user equipment, or network configuration information.

5. The method according to claim 1, wherein the method further comprising: updating and/or adjusting, by an operator or a network, the mobility management mapping or the mobility mapping for the user equipment; and/or after the mobility support level or the mobility management mechanism to be provided to the user equipment is determined, the method further comprises: updating and/or adjusting, by an operator or a network, the mobility support level or the mobility management mechanism.

6. The method according to claim 1, wherein after the mobility support level or the mobility management mechanism to be provided to the user equipment is determined, the method further comprises:

transmitting an instruction to a device for providing a mobility management support for the user equipment according to the mobility support level or the mobility management mechanism.

7. An apparatus for determining mobility management support required by and to be provided to a user equipment, the apparatus comprising:

a processor configured to read programs in a memory to perform:

determining mobility management related information of the user equipment or mobility related information of the user equipment;

determining a mobility management mapping for the user equipment according to the mobility management related information, or determining a mobility mapping for the user equipment according to the mobility related information, wherein the mobility management mapping is a mapping between a condition that the user equipment associated with, and a desired mobility support level, or between a condition that the user equipment associated with, and mobility management mechanism, and the mobility mapping is a mapping between the condition that the user equipment associated with, and a mobility level of the user equipment; and determining the mobility support level or the mobility management mechanism to be provided to the user equipment, according to the mobility management mapping for the user equipment, or determining a mobility support level or a mobility management mechanism to be provided to the user equipment, according to the condition that the user equipment associated with, and the mobility mapping for the user equipment; and a transceiver configured to transmit and receive data under the control of the processor to perform: transmitting an instruction after the mobility support level or the mobility management mechanism to be provided to the user equipment is determined according to the mobility management mapping for the user equipment;

wherein the processor is further configured to determine the mobility management related information of the user equipment, or the mobility related information of the user equipment comprising one or a combination of following information:

an SIM card type, and a period of time in which the user equipment is operating;

wherein the processor is further configured to apply the mobility management mapping or the mobility mapping generated from a communication model of the user equipment;

wherein the processor is further configured to apply the mobility management mapping comprises following mapping relationship:

the communication mode of the user equipment is to support only unidirectional data initiated by the user equipment, and desired mobility management has no paging function to be provided.

8. The apparatus according to claim 7, wherein the processor is further configured to apply the condition that the user equipment associated with comprising one or a combination of following information:

a user equipment type, a period of time in which the user equipment is operating, a site where the user equipment is located, user setting on the user equipment, a state of the user equipment in a network, and a service requested by the user equipment.

9. The apparatus according to claim 7, wherein when the processor determines the mobility support level or the mobility management mechanism to be provided to the user equipment according to the mobility management mapping for the user equipment, the processor is further configured: to determine the condition that the user equipment associated with according to the mobility related information of the user equipment; and to determine the mobility support level or the mobility management mechanism of the user equipment from the mobility management mapping for the user equipment according to the condition that the user equipment associated with.

10. The apparatus according to claim 7, wherein the processor is further configured to determine the mobility management mapping for the user equipment, or the mobility mapping for the user equipment in subscription information of the user equipment, or network configuration information.

11. The apparatus according to claim 7, wherein the processor is further configured to update and/or adjust the mobility management mapping or the mobility mapping for the user equipment through an operator or a network; and/or to update and/or adjust the mobility support level or the mobility management mechanism through an operator or a network after the mobility support level or the mobility management mechanism to be provided to the user equipment is determined.

12. The apparatus according to claim 7, wherein the processor is further configured:
to transmit an instruction to a device for providing a mobility management support for the user equipment according to the mobility support level or the mobility management mechanism after the mobility support level or the mobility management mechanism to be provided to the user equipment is determined.

* * * * *